(12) United States Patent
Gertenbach et al.

(10) Patent No.: US 11,527,051 B2
(45) Date of Patent: Dec. 13, 2022

(54) EXTENDED REALITY ASSEMBLY MODELING

(71) Applicant: Medtronic, Inc., Minneapolis, MN (US)

(72) Inventors: Ryan H. Gertenbach, Chandler, AZ (US); Michael J. Ferguson, Gilbert, AZ (US); William C. Harding, Chandler, AZ (US); Patrick W. Kinzie, Glendale, AZ (US); Emily Clare Byrne, Tempe, AZ (US)

(73) Assignee: MEDTRONIC INC., Minneapolis, MN (US)

( * ) Notice: Subject to any disclaimer, the term of this patent is extended or adjusted under 35 U.S.C. 154(b) by 39 days.

(21) Appl. No.: 17/161,250

(22) Filed: Jan. 28, 2021

(65) Prior Publication Data

US 2021/0150822 A1 May 20, 2021

Related U.S. Application Data

(62) Division of application No. 16/195,633, filed on Nov. 19, 2018, now Pat. No. 10,943,410.

(51) Int. Cl.
*G06T 19/20* (2011.01)
*G06T 17/00* (2006.01)
*G06T 19/00* (2011.01)
G06F 3/16 (2006.01)
G06F 3/04815 (2022.01)

(52) U.S. Cl.
CPC .............. *G06T 19/20* (2013.01); *G06T 17/00* (2013.01); *G06T 19/006* (2013.01); *G06F 3/04815* (2013.01); *G06F 3/167* (2013.01); *G06T 2200/24* (2013.01); *G06T 2210/41* (2013.01); *G06T 2219/2008* (2013.01); *G06T 2219/2012* (2013.01); *G06T 2219/2016* (2013.01)

(58) Field of Classification Search
None
See application file for complete search history.

(56) References Cited

U.S. PATENT DOCUMENTS

| 7,371,067 | B2 | 5/2008 | Anderson et al. | |
|---|---|---|---|---|
| 2010/0217336 | A1* | 8/2010 | Crawford | G16H 50/50 606/86 R |
| 2015/0049083 | A1 | 2/2015 | Bidne et al. | |
| 2015/0123970 | A1 | 5/2015 | Gyger et al. | |
| 2017/0319172 | A1 | 11/2017 | Harley et al. | |
| 2017/0323473 | A1* | 11/2017 | Wright | G06T 19/00 |
| 2017/0360578 | A1* | 12/2017 | Shin | G09B 23/286 |
| 2020/0082629 | A1 | 3/2020 | Jones et al. | |
| 2021/0350179 | A1* | 11/2021 | Bello | G06N 3/0454 |

\* cited by examiner

*Primary Examiner* — James A Thompson
(74) *Attorney, Agent, or Firm* — Shumaker & Sieffert, P.A.

(57) ABSTRACT

Methods, systems, and devices for creating a model of a medical device for use in an extended reality (XR) system are described. The method may include receiving a three-dimensional model of the medical device, where the three-dimensional model is represented by a plurality of vectors. The method may further include reducing a number of the plurality of vectors to at least below a maximum vector count threshold while maintaining at least a minimum model resolution threshold. In some cases, the method may include assigning one or more components to the reduced number of the plurality of vectors. The method may further include configuring a software-executable file for displaying an XR version of the three-dimensional model of the medical device.

21 Claims, 13 Drawing Sheets

EXTENDED REALITY ASSEMBLY MODELING

CROSS REFERENCE

The present Application for Patent is a divisional of U.S. patent application Ser. No. 16/195,633 by Gertenbach et al., entitled "EXTENDED REALITY ASSEMBLY MODELING," filed Nov. 19, 2018, assigned to the assignee hereof, and is expressly incorporated by references in its entirety herein.

BACKGROUND

The following relates generally to creating a model of a medical device for use in an extended reality (XR) system (i.e., the embodiment of an augmented, virtual, and mixed reality), and more specifically to extended reality assembly modeling.

In an industry such as a medical device manufacturing facility, products and equipment (e.g., medical devices) may be manufactured. The medical devices may be transmitted between manufacturing facilities, thereby allowing engineers and technicians to interact with the medical device and provide suggested improvements. In some cases, the medical devices may be transmitted to a healthcare facility or a customer, thereby allowing the customer (e.g., patient) to manipulate and control the medical device.

Because each medical device may vary in size, transporting each medical device between manufacturing or healthcare facilities may be difficult and costly. In some cases, an implantable medical device may be too small to disassemble and analyze. In other examples, a medical device may be difficult to transport to a production facility overseas based on the internal components and protocols associated with the medical device. As such, transportation of medical devices may be hindered, which may lead to reducing cross-collaboration within a company with more than one medical device manufacturing facility. In some cases, rather than shipping a physical device for inspection or training, a user may receive and view a three-dimensional model of the medical device. However, the ability to prepare a three-dimensional model of a medical device suitable for visual manipulation may be limited by aspects of the formatting used for models of medical devices, computational processing limitations, and the like.

SUMMARY

The described features generally relate to methods, systems, devices, or apparatuses that support extended reality (XR) assembly modeling. An XR application server within a computing device (e.g., computer) may receive a three-dimensional model of a medical device. In some cases, the three-dimensional model may be represented by a plurality of vectors. To create a model of the medical device for use in an XR system, the XR application server may reduce a number of the plurality of vectors to below a maximum vector count while also maintaining a minimum model resolution. The XR application server may assign components to the reduced number of the plurality of vectors and configure a software-executable file for displaying an XR version of the three-dimensional model of the medical device. For example, a user may manipulate and interact with the displayed XR version of the three-dimensional model of the medical device (e.g., move components, color components, adjust the size of components, etc.).

To use the model of the medical device in an XR system, an XR application (e.g., XR application server) may receive the software-executable file for displaying the XR version of a three-dimensional model of the medical device. The XR application server may render the XR version of the three-dimensional model for display on the XR system. The XR application server may also receive an indication to manipulate the XR version of the three-dimensional model based on a user interaction with the XR version. For example, the user interaction may include a view adjustment, a location adjustment, a color adjustment, a size adjustment, or a combination thereof.

A method for of creating a model of a medical device for use in an XR system is described. The method may include receiving a three-dimensional model of the medical device, wherein the three-dimensional model is represented by a plurality of vectors, reducing a number of the plurality of vectors to at least below a maximum vector count threshold while maintaining at least a minimum model resolution threshold, assigning one or more components to the reduced number of the plurality of vectors of the three-dimensional model of the medical device, and configuring a software-executable file for displaying an XR version of the three-dimensional model of the medical device.

In some examples of the method described herein may further include identifying a parameter associated with the one or more components based at least in part on assigning the one or more components, wherein the parameter comprises a movement limitation, a size adjustment limitation, a color assignment, or a combination thereof. Some examples of the method described herein may further include assigning the movement limitation to the one or more components based at least in part on user input, wherein the user input comprises an indication to update a location of the one or more components, wherein the movement limitation comprises a rotational limitation of the one or more components, a translational limitation of the one or more components, or both.

Some examples of the method described herein may further include assigning the size adjustment limitation to the one or more components based at least in part on user input, wherein the user input comprises an indication to update a size of the one or more components. Some examples of the method described herein may further include assigning the color adjustment limitation to the one or more components based at least in part on user input, wherein the user input comprises an indication to update a color of the one or more components. Some examples of the method described herein may further include configuring the three-dimensional model to render externally visible components and internal components of the one or more components at a same time.

Some examples of the method described herein may further include identifying the one or more components based at least in part on user input, wherein the user input comprises a manual selection of the one or more components by a user, a voice request to select the one or more components by the user, or both. Some examples of the method described herein may further include transmitting the software-executable file to an XR application configured to display the XR version of the three-dimensional model based at least in part on configuring the software-executable file. In some examples, assigning the one or more components to the three-dimensional model may include accessing a database configured to store the one or more components and retrieving the one or more components from the database. Some examples of the method described herein may further include determining the maximum vector count threshold based at least in part on a predetermined limit associated with the number of the plurality of vectors. Some examples of the method described herein may further include determining the minimum model resolution threshold based at least in part on a predetermined granularity for displaying the XR version of the three-dimensional model.

A method of using a model of a medical device in an XR system is described. The method may include receiving a software-executable file for displaying an XR version of a three-dimensional model of the medical device, wherein the three-dimensional model of the medical device is represented by a reduced number of a plurality of vectors, and wherein the reduced number of the plurality of vectors is at least below a maximum vector count threshold while maintaining at least a minimum model resolution threshold, rendering the XR version of the three-dimensional model for display on the XR system, and receiving an indication to manipulate the XR version of the three-dimensional model based at least in part on a user interaction with the XR version.

Some examples of the method described herein may further include rendering externally visible components and internal components of the three-dimensional model at a same time, wherein the externally visible components and the internal components are assigned to the reduced number of the plurality of vectors of the three-dimensional model. Some examples of the method described herein may further include disassembling the extended reality version of the three-dimensional model for identifying the internal components within the three-dimensional model in response to receiving the indication to manipulate.

Some examples of the method described herein may further include adjusting a view of one or more components of the three-dimensional model based at least in part on receiving the indication to manipulate. Some examples of the method described herein may further include adjusting a location of one or more components of the three-dimensional model based at least in part on receiving the indication to manipulate, wherein adjusting the location comprises a rotation of the one or more components, a translation of the one or more components, or both. Some examples of the method described herein may further include adjusting a size of one or more components of the three-dimensional model based at least in part on receiving the indication to manipulate. Some examples of the method described herein may further include adjusting a color of one or more components of the three-dimensional model based at least in part on receiving the indication to manipulate Some examples of the method described herein may further include operations, features, means, or instructions for receiving a three-dimensional model of the medical device, wherein the three-dimensional model is represented by a plurality of vectors, reducing a number of the plurality of vectors to at least below a maximum vector count threshold while maintaining at least a minimum model resolution threshold, assigning one or more components to the reduced number of the plurality of vectors of the three-dimensional model of the medical device, and configuring a software-executable file for displaying an XR version of the three-dimensional model of the medical device.

Some examples of the method described herein may further include operations, features, means, or instructions for receiving a software-executable file for displaying an XR version of a three-dimensional model of the medical device, wherein the three-dimensional model of the medical device is represented by a reduced number of a plurality of vectors, and wherein the reduced number of the plurality of vectors is at least below a maximum vector count threshold while maintaining at least a minimum model resolution threshold, rendering the XR version of the three-dimensional model for display on the XR system, and receiving an indication to manipulate the extended reality version of the three-dimensional model based at least in part on a user interaction with the extended reality version.

DETAILED DESCRIPTION

Figure 1:
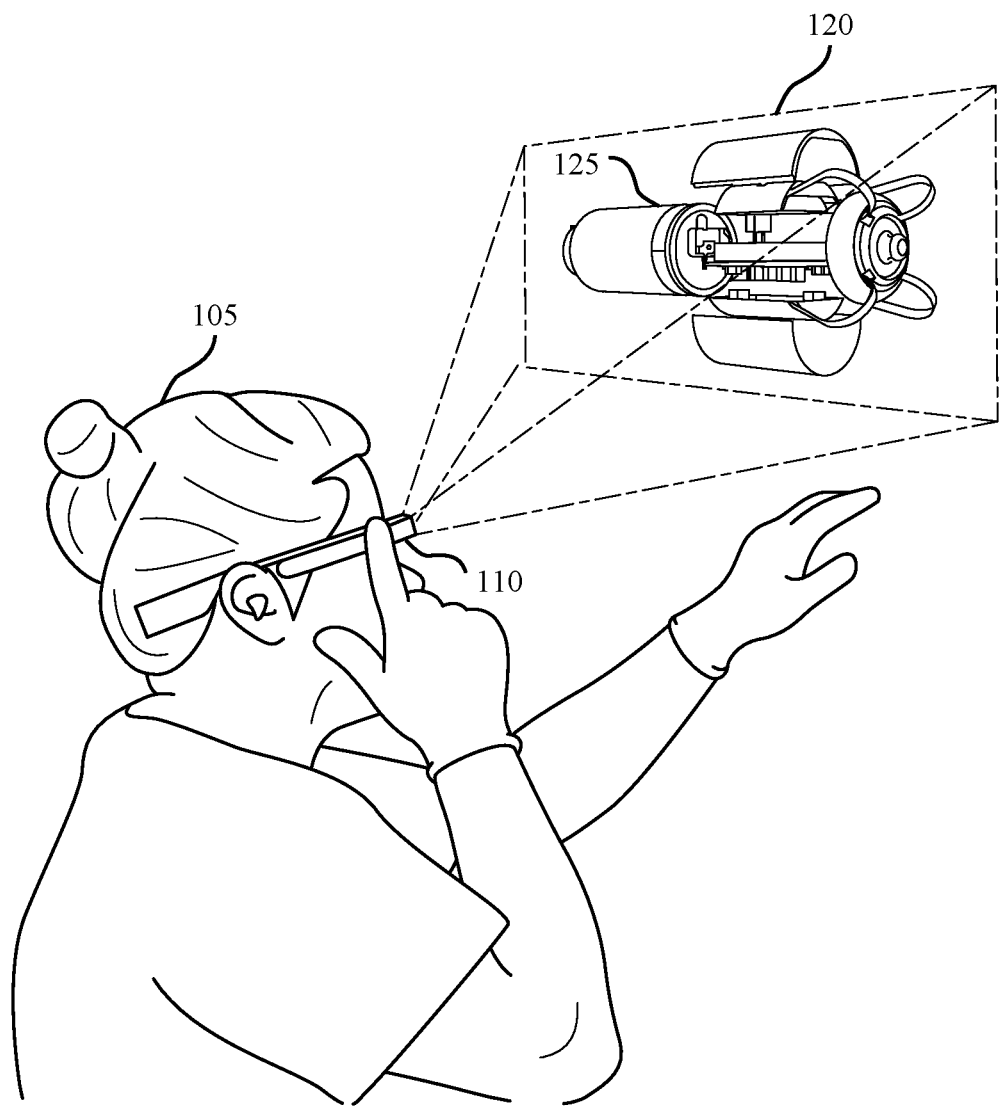
FIG. 1 illustrates an example of a system that supports extended reality (XR) assembly modeling in accordance with aspects of the present disclosure.

In a manufacturing or production facility, engineers and technicians may manually interact with a product or design equipment. In some cases, the product or component of the design equipment may be transferred to a different manufacturing or production facility where other engineers or technicians may work on the product or component. Such transportation can be costly, time consuming, and logistically difficult. Moreover, once the product or component arrives at the destination, interacting with the product may involve disassembly, which may damage the product. Rather than send a physical product, in accordance with aspects of the present disclosure, a three-dimensional model of the device (e.g., medical device) may be transmitted between facilities, thereby allowing the user to interact with the device in a non-destructive manner. That is, the user may manipulate the three-dimensional model of the medical device without having to physically deconstruct the medical device, thereby reducing the effort and cost to transport devices between production facilities.

In some cases, a model of the medical device may be originally designed in a mechanical CAD (computer-aided design) application. The CAD model of the medical device may include a high level of detail and precision to facilitate the machining and assembly of the medical device. Due to the high level of detail, the CAD model may include a large number of vectors to represent the surfaces and features of the model. As described herein, the CAD model of the medical device may be converted or adapted for use in an extended reality (XR) application. The conversion may require some processing to make the CAD model suitable for the XR application. For example, the conversion of the high resolution CAD model of the medical device to a three-dimensional model for use in the XR application may require a reduction in the number of vectors in the CAD model. As described in more detail below, the vector reduction process may be based on a number of factors (e.g., processing limits, user-defined parameters, and/or shape, size, or importance of a particular component) and may generally serve the purpose of reducing the complexity of the CAD model to a level more suitable for the XR application.

The XR application may allow for the user to view and manipulate a programmed model of the medical device. For example, the user may access products and equipment in an XR environment such that the products and equipment may be assembled and disassembled at a component or sub-component level. The XR environment may be supported by handheld, fixed mounted, or wearable XR technology. In some cases, the products and equipment may be manipulated via a voice command or other biometric interfaces within an XR application.

In some cases, the model of a medical device (or any other type of device) may be created in an XR system by first receiving a three-dimensional model of the medical device. The medical device may be represented by a plurality of vectors. To optimize the parameters associated with the three-dimensional model of the medical device, an XR application server may reduce a vector size or a vector count of the plurality of vectors. For example, the XR application server may reduce a number of the plurality of vectors to below a maximum vector count threshold and maintain a minimum resolution of the three-dimensional model.

In order to manipulate the three-dimensional model, components may be assigned to the reduced number of the plurality of vectors. For example, the user may be able to interact with the three-dimensional model by selecting one or more components and dissembling the three-dimensional model. In some examples, the server may adjust a size, location, color, or orientation of the components based on the user interactions. In some cases, the XR application server may render external and internal components at the same time to optimize an efficiency and time to interact with the three-dimensional model.

In some cases, the assembly and disassembly of products in XR may allow customers or employee training on the product, manufacturing, marketing, and design. Because each component of the device may be an example of a virtual sub-part, the risk of handling damage and transportation damage may decrease. In some examples, because the device may be designed through an XR application, the cost of use and wear of the medical device for training purposes may reduce.

A software-executable file may be configured to display an XR version of the three-dimensional model of the medical device. In some cases, the software-executable file may be transmitted to an XR application configured to display the XR version of the three-dimensional model. To use the model of the medical device in the XR system, the software-executable file may be received and the XR version of the three-dimensional model may be rendered for displaying on the XR system. The XR system may then receive an indication to manipulate the XR version of the three-dimensional model based on a user interaction with the XR version. For example, the user interaction may include an indication to adjust a size, color, location, or a combination thereof for the components of the three-dimensional medical device.

In some cases, rendering the three-dimensional model of the medical device by reducing a number of the plurality of vectors may reduce a complexity of the three-dimensional model. For example, the server may dissemble the three-dimensional model while maintaining enough design granularity to allow one or more users to collaborate with the medical device (e.g., based on user input).

Aspects of the disclosure are initially described in the context of an XR system. Aspects of the disclosure are further illustrated by and described with reference to apparatus diagrams, system diagrams, and flowcharts that relate to XR assembly modeling.

FIG. 1 illustrates an example of an XR system 100 that supports XR assembly modeling in accordance with aspects of the present disclosure. In some examples, XR system 100 may include a user 105 wearing a head mounted display (HMD) 110 in which the principles included herein may be implemented. The XR system 100 may also include a device. In some examples, the user 105 may interact with the device. For example, the device may be an example or, but is not limited to, a medical device.

The optical HMD 110 may be a wearable device that has the capability of reflecting projected images as well as allowing a user to experience XR. Head-mounted displays typically involve near-eye optics to create "virtual" images. The HMD 110 may include eyewear or headwear in which a near-eye display (NED) 120 may be affixed in front of a user's eyes. The NED 120 may include a diffractive element portion disposed within or incorporated with a lens assembly of the HMD 110. The HMD 110 may include a light source or light projector operatively coupled to the lens assembly.

The NED 120 may be utilized in an HMD 110, XR, virtual reality (VR) application such as, but not limited to, the HMD 110, mixed reality (e.g., XR), or a combination thereof. The NED 120 may also be utilized in various optical coupling applications such as, but not limited to, large screen display and optical sensor applications. In some cases, the NED 120 may be projected onto a personal computer, tablet, phone, or a device capable of rendering a three-dimensional model.

The NED 120 may include a three-dimensional model 125. The three-dimensional model 125 may be an example of a medical device configured to collect a variety of physiological parameters as well as information related to the location and movement of the patient. In some cases, the three-dimensional model may be an example of a medical device or a component of a medical device.

In accordance with aspects of the present disclosure, an XR application server may render the three-dimensional model 125 of a medical device. For example, the HMD 110 may project the NED 120, and the user 105 may interact with the three-dimensional model 125. The user 105 may manipulate the three-dimensional model. For example, the user 105 may move the three-dimensional model 125, adjust a size of the three-dimensional model 125, or adjust a color of the three-dimensional model 125. In that case, the XR application server may receive an indication to manipulate the three-dimensional model 125 based on an interaction between the user 105 and the three-dimensional model 125.

As discussed below in more detail, the XR application server may receive the three-dimensional model 125 of the medical device and reduce a number of the plurality of vectors that comprise the three-dimensional model 125. The XR application server may also assign components to the three-dimensional model 125 and configure a software-executable file for displaying an XR version of the three-dimensional model 125 in the NED 120.

In some cases, the HMD 110 may include an XR application server that receives the software-executable file for displaying the XR version of the three-dimensional model 125. The XR application server may render the XR version of the three-dimensional model 125 for display on the XR system (e.g., NED 120). In some examples, the XR application server may receive an indication to manipulate the XR version of the three-dimensional model 125 based on an interaction between the user 105 and the XR version of the three-dimensional model 125. For example, the XR application server may disassemble the three-dimensional model 125 so that the subcomponents can be individually viewed and manipulated.

Figure 2A:
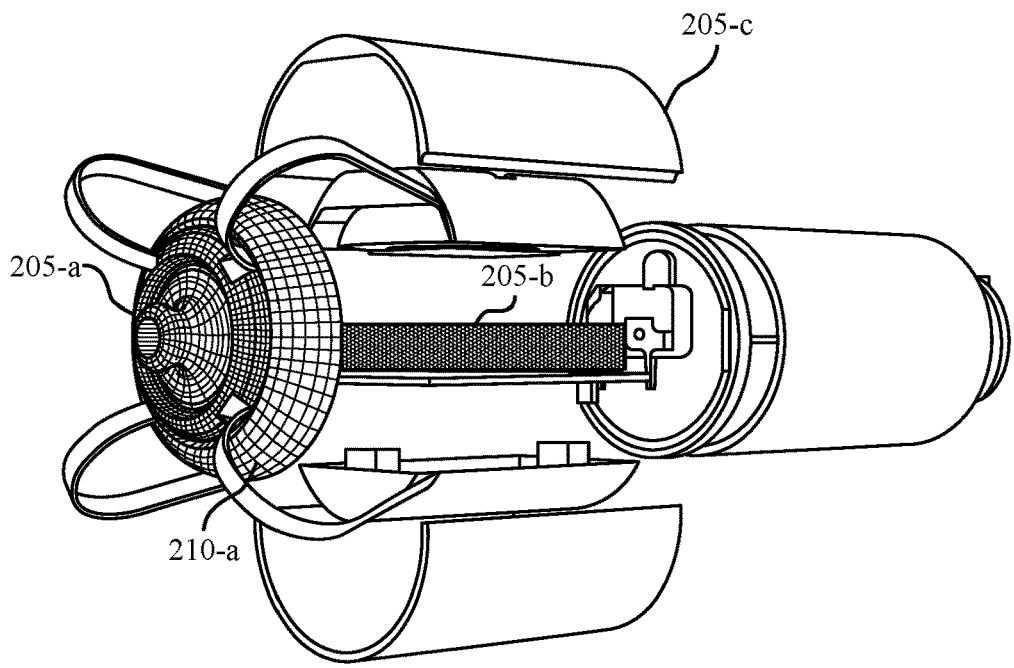
FIG. 2A illustrates an example of a three-dimensional model that supports XR assembly modeling in accordance with aspects of the present disclosure.

FIG. 2A illustrates an example of a three-dimensional model 200-a that supports XR assembly modeling in accordance with aspects of the present disclosure. In some examples, the three-dimensional model 200-a may be an example of three-dimensional model 125 as described with reference to FIG. 1. The three-dimensional model 200-a may include at least components 205-a, 205-b, and 205-c. In some examples, the three-dimensional model 200-a may be represented by a plurality of vectors 210-a.

A vector 210-a may be an example of a point in space used to define the three-dimensional model 200-a. For example, the plurality of vectors 210-a may define the shape of components 205-a, 205-b, and 205-c. In some cases, component 205-c may include more vectors 210-a than component 205-b due to the shape of component 205-c. For example, components that include a curved surface may include more vectors 210-a than components that include a flat surface. Each point of the plurality of vectors 210-a may be represented as a mathematical point that the computer or an application associated with the XR system may define when components 205-a, 205-b, and 205-c are moved. The application associated with the XR system may process each of vectors 210-a as the model is manipulated by the user.

In some cases, the three-dimensional model 200-a may be split into one or more components 205. For example, the component 205-a may be assigned to the plurality of vectors 210-a. The component 205-b may be an example of an internal component, and the component 205-c may be an example of an external component. In some cases, the internal component (e.g., component 205-b) and the external component (e.g., component 205-c) may be rendered at the same time during operation. As such, during manipulation of the model 200-a using an XR system, if an external component is moved or removed (e.g., in response to a user command), the internal component is already rendered and viewable by the user via the XR system.

The XR application server may identify a parameter associated with components 205-a, 205-b, and 205-c. For example, the XR application server may assign a movement limitation to components 205-a, 205-b, and 205-c. The movement limitation may include a rotational limitation, a translational limitation, or both, where the movement limitation may be based on user input. In some examples, the XR application server may assign a size adjustment limitation to components 205-a, 205-b, and 205-c. In that case, the size of components 205-a, 205-b, and 205-c may increase or decrease according to user input. In other examples, the XR application server may assign a color adjustment limitation to components 205-a, 205-b, and 205-c. For example, the color of component 205-b may be updated or changed based on user input as compared to the color of component 205-a or 205-c.

The user input may include a manual selection of the components 205-a, 205-b, and 205-c. In other examples, the user input may include a voice request to select the components 205-a, 205-b, and 205-c. As discussed below in more detail, the XR application server may receive the user input and manipulate the components 205-a, 205-b, and 205-c accordingly. For example, the user may pinch and drag the component 205-a to resize the component 205-a. In some cases, the user may select an individual vector included in the plurality of vectors 210-a and pinch and drag the vector to resize the component 205-a.

The initial vector count of three-dimensional model 200-a may be higher than a maximum vector count based on a predetermined limit associated with the number of the plurality of vectors 210-a. For example, the initial vector count of three-dimensional model 200-a may be higher because the model of the medical device may be initially designed in the CAD application. The mechanical CAD application may require a higher vector count as the mechanical CAD application may emphasize a high mechanical measurement tolerance. In that case, to convert a CAD model of the medical device to a three-dimensional model of the medical device for use in an extended reality (XR) application, the XR application server may reduce the plurality of vectors 210-a in the CAD model of the medical device. As discussed below, the vector reduction process may be based on a number of factors and may vary for different components of the device.

The maximum vector count may be configurable by a user and may be a function of processing resources of a computer or an application associated with the XR system. The total number of the plurality of vectors 210-a may be reduced to fall within the maximum vector count. For example, the plurality of vectors 210-a may be reduced according to Nurbs (non-uniform rational basis spline) modeling. In that case, the vector quantity may decrease without losing the resolution. In some cases, reducing the vector count may also reduce a resolution of the model 200-a. Reducing the amount of vectors 210-a may display a clear XR version of the three-dimensional model 200-a and allow for a decrease in processing time associated with the three-dimensional model 200-a.

Figure 2B:
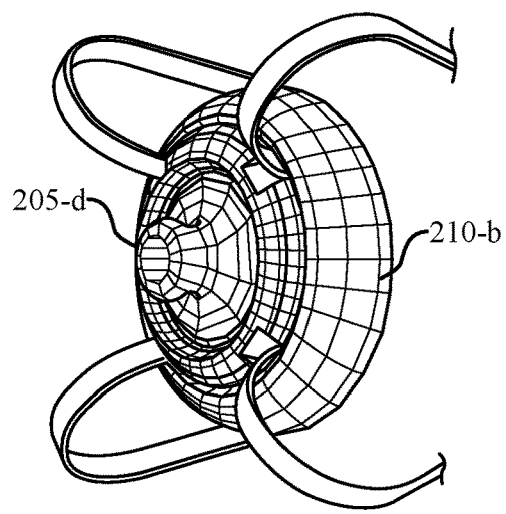
FIG. 2B illustrates an example of a reduced three-dimensional model that supports XR assembly modeling in accordance with aspects of the present disclosure.

FIG. 2B illustrates an example of a reduced three-dimensional model 200-b that supports XR assembly modeling in accordance with aspects of the present disclosure. In some examples, the reduced three-dimensional model 200-b may be an example of three-dimensional model 125 as described with reference to FIG. 1. The reduced three-dimensional model 200-b may include component 205-d. In some examples, the reduced three-dimensional model 200-b may be represented by a plurality of vectors 210-b.

In some cases, the component 205-d may be assigned to the plurality of vectors 210-b. In order to optimize the process of displaying the reduced three-dimensional model 200-b, the plurality of vectors 210-b may be reduced. For example, the plurality of vectors 210-b may be reduced to below a maximum vector count while also maintaining at least a minimum resolution of the reduced three-dimensional model 200-b. The XR application server may determine the maximum vector count based on a predetermined limit associated with the number of the plurality of vectors 210-b. In some cases, the XR application server may determine the minimum resolution of reduced three-dimensional model 200-b based on a pre-determined granularity for displaying the XR version of the reduced three-dimensional model 200-b. In some cases, the level of granularity may be determined prior to reducing number of the plurality of vectors 210-b. The minimum resolution may be configurable by a user, and may depend on the type of device being displayed, the size of the device, and the like.

The XR application server may process each individual vector of the plurality of vectors 210-b as a point. In that case, each individual vector of the plurality of vectors 210-a may be individually manipulated. The vector reduction for the plurality of vectors 210-b may include a three-dimensional plane rather than a line of curvature. In some cases, a single vector or a plurality of vectors 210-b may be highlighted to break out into an individual component 205-d.

Figure 3:
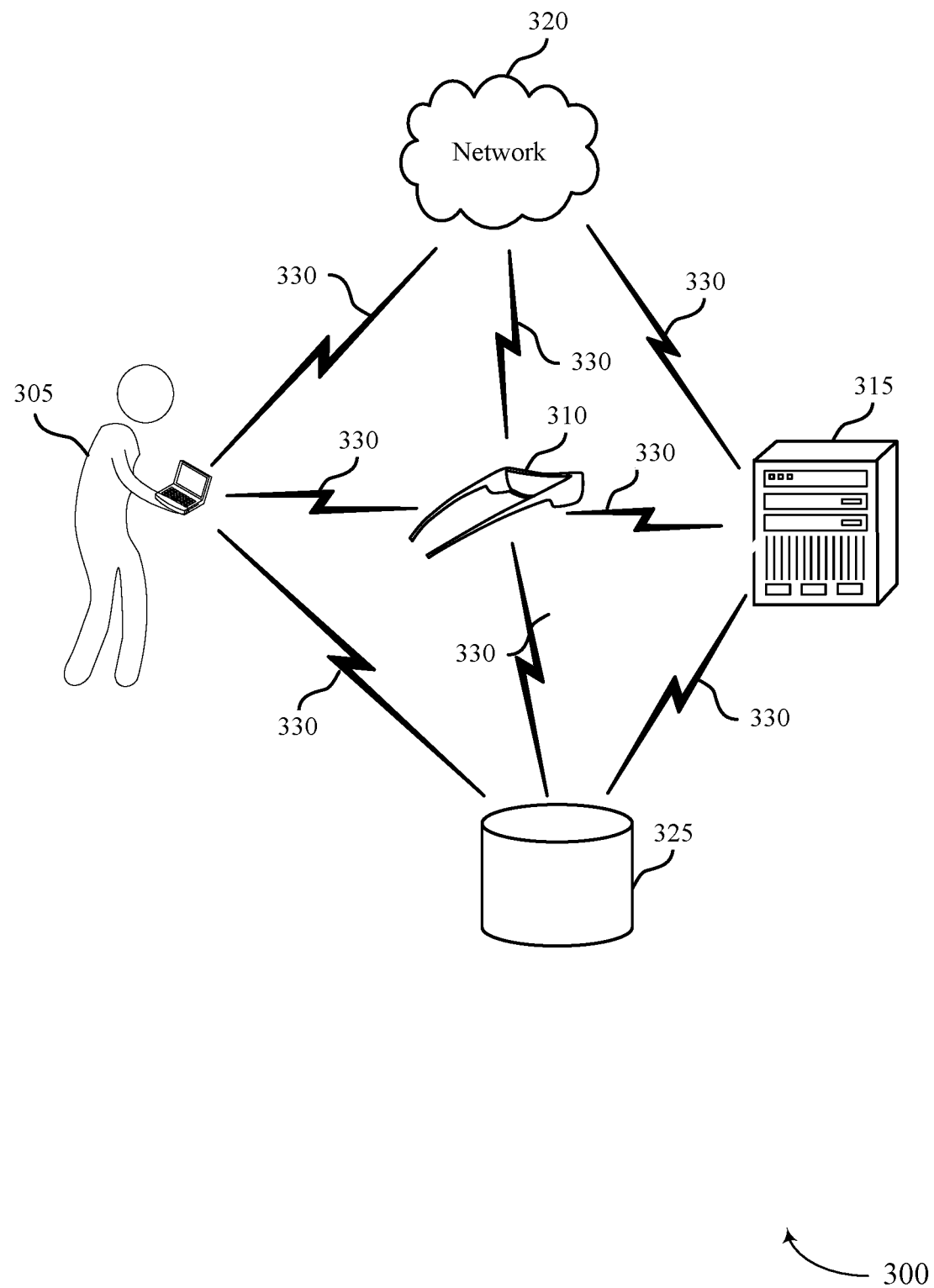
FIG. 3 illustrates an example of a system that supports XR assembly modeling in accordance with aspects of the present disclosure.

FIG. 3 illustrates an example of system 300 that supports XR assembly modeling in accordance with aspects of the present disclosure. The system 300 may be an example of aspects of XR system 100 and may include a user 305 wearing, carrying, or otherwise coupled with the computing device 310.

The computing device 310 may communicate bidirectionally via wired or wireless communication links 330 to network 320 or XR application server 315. Computing device 310 may be an example of an HMD, XR, virtual reality (VR) application such as, but not limited to, the HMD, mixed reality (e.g., XR), or a combination thereof. Computing device 310 may also be a wireless device such as a tablet, cellular phone, personal digital assistant (PDA), a dedicated receiver, or other similar device or a spatially distributed network of devices configured to receive signals. Computing device 310 may be a wireless laptop computer configured to receive signals. The computing device 310 may be in communication with an XR application server 315 via network 320.

The XR application server 315 may be an example of a central station or server that receives a three-dimensional model of the medical device and configures a software-executable file for displaying an XR version of the three-dimensional model. For example, XR application server 315 may communicate bidirectionally via wired or wireless communication links 330 to database 325. Database 325 may store one or more components associated with the three-dimensional model of the medical device. For example, the XR application server 315 may access the database 325 and retrieve the one or more components from the database 325. In that case, the XR application server 315 may assign the one or more components to the three-dimensional model. In some cases, the XR application server 315 may communication between an XR application server 315 in a different location. For example, the three-dimensional model of the medical device may be transferred to a different manufacturing or production facility (e.g., XR application server 315) where other engineers or technicians may work on the three-dimensional model of the medical device.

Data transmission may occur via, for example, frequencies appropriate for a personal area network (such as Bluetooth, Bluetooth Low Energy (BLE), or IR communications) or local (e.g., wireless local area network (WLAN)) or wide area network (WAN) frequencies such as radio frequencies specified by IEEE standards (e.g., IEEE 802.15.4 standard, IEEE 802.11 standard (Wi-Fi), IEEE 802.16 standard (WiMAX), etc.).

In some cases, the XR application server 315 may receive a software-executable file for displaying an XR version of a three-dimensional model of the medical device. In some examples, the three-dimensional model of the medical device may be represented by a reduced number of a plurality of vectors and at least below a maximum vector count threshold while maintaining at least a minimum model resolution threshold. The XR application server 315 may render the XR version of the three-dimensional model and receive an indication to manipulate the XR version of the three-dimensional model based on a user interaction with the XR version.

In some cases, the minimum model resolution threshold may be determined based on a XR use case for a particular component of the medical device. For example, if the medical device includes various components, XR application server 315 may flag (e.g., automatically or based on user input) the components of interest (e.g., to be viewed or manipulated by user 305). For example, a particular mechanical component of the medical device may be flagged to be viewed or manipulated by user 305. In such cases, the flagged components may maintain a higher minimum model resolution threshold than the other components of the medical device. In some examples, XR application server 315 may automatically determine the minimum model resolution threshold based on the unselected components of the medical device. For example, if two components of the medical device are unselected, a component joining the two unselected components may also maintain the minimum model resolution threshold as the two unselected components. In such cases, the unselected components may maintain a lower minimum model resolution threshold than a minimum model resolution threshold of selected components of the medical device. In some cases, the resolution threshold may be based on the intended use case of the component or the relative importance of a component with respect to other components of the device. For example, if a particular component (e.g., a seal) of a medical device is determined (e.g., by user configuration) to be critical to the functionality of the device, then this component may automatically be assigned a higher minimum resolution threshold than the other components.

For example, the three-dimensional model may be imported into computing device 310 and the vector size of the components within the three-dimensional model may be optimized (e.g., reduced). The components of the three-dimensional model may be resized and moved to a different location based on user input associated with user 305. For example, XR application server 315 may adjust a view of one or more components of the three-dimensional model when the XR application server 315 receives an indication from the user 305.

In some cases, XR application server 315 may adjust a size, location, and/or color of one or more components of the three-dimensional model when the XR application server 315 receives an indication that the user 305 requests to adjust the size, location, and/or color, respectively. For example, the XR application server 315 may receive an indication that the user 305 manually selects the component in a first location and moves the component to a second location within the XR version display. In that case, the XR application server 315 may move (e.g., disassemble) the XR version of the three-dimensional model in response to the user input. In some examples, the minimum model resolution threshold may be determined based on the shape of the component. For example, a component with a square or flat shape may include less vectors than a component with a round shape. In that case, the component with the square or flat shape may maintain a lower minimum model resolution threshold than a minimum model resolution threshold of the component with a round shape.

In some examples, the XR application server 315 may receive a voice command associated with user 305. In that case, the user 305 may request to select a component associated with the three-dimensional model and request to move the component within the XR version display. In some cases, the XR application server 315 may identify components (e.g., internal and external components) based on a voice command associated with user 305. In some cases, the voice command may be one or two words that describe the action of interest.

The XR application server 315 may transmit a request to the user 305. In that case, the user 305 may receive the request and respond to the request through verbal or manual input. For example, the XR application server 315 may ask the user 305 if the user 305 selected the internal component of interest. In response, the user 305 may respond with a wearable interaction (e.g., move the head, move the wrist, etc.) to indicate that the user 305 selected the internal component of interest.

Figure 4:
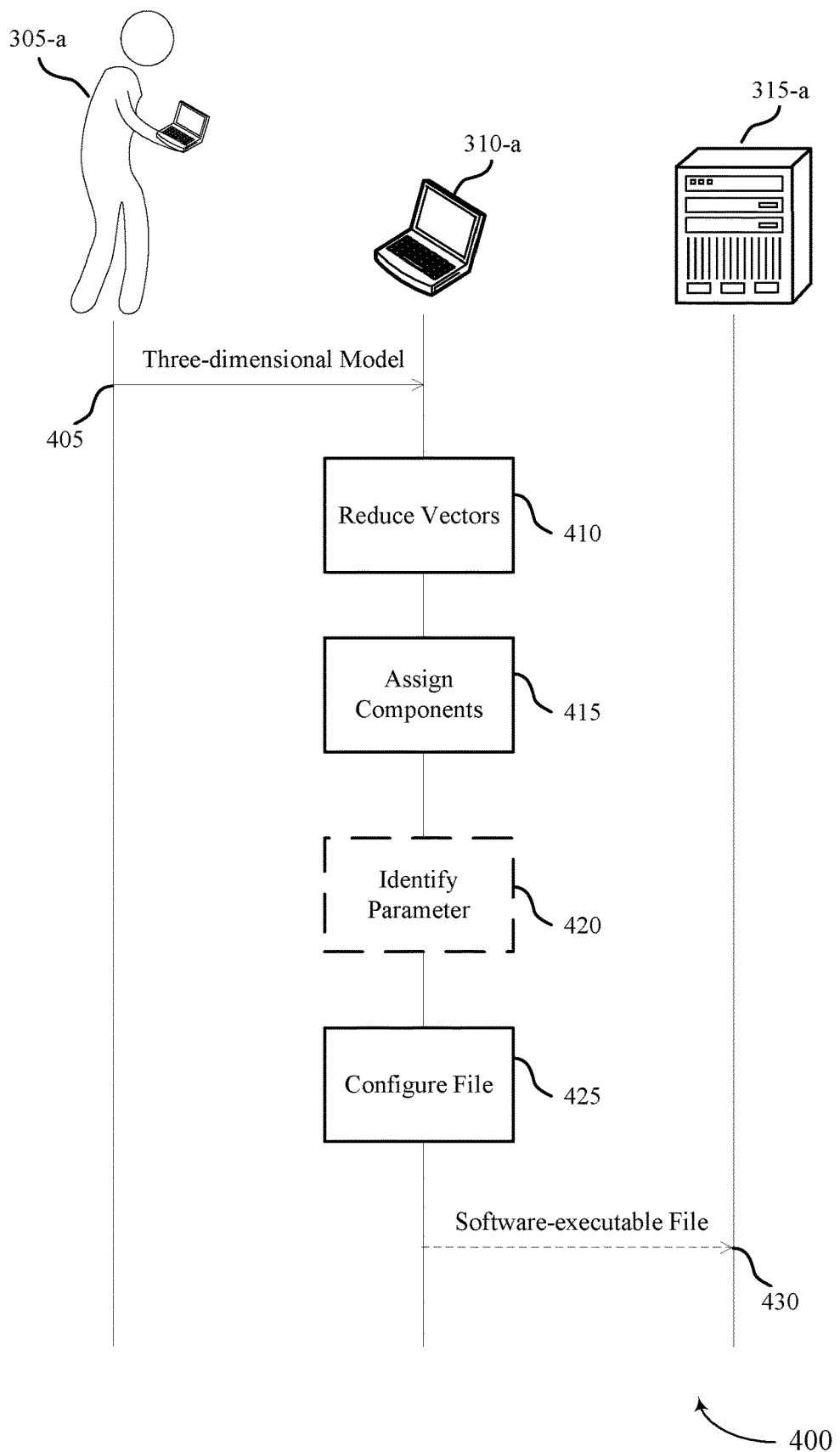
FIG. 4 illustrates an example of a process flow that supports XR assembly modeling in accordance with aspects of the present disclosure.

FIG. 4 illustrates an example of a process flow 400 that supports XR assembly modeling in accordance with aspects of the present disclosure. Process flow 400 may include user 305-a, computing device 310-a, and XR application server 315-a which may be respective examples of user 305, computing device 310, and XR application server 315 as described with reference to FIGS. 1-3. The computing device 310-a may be an example of a central station, server, or both as described herein. Alternative examples of the following may be implemented, where some steps are performed in a different order or not at all. Some steps may additionally include additional features not mentioned above.

Computing device 310-a may receive three-dimensional model 405. For example, computing device 310-a may receive a three-dimensional model of the medical device, where the three-dimensional model is represented by a plurality of vectors. At block 410, computing device 310-a may reduce the vectors. For example, computing device 310-a may reduce a number of the plurality of vectors to at least below a maximum vector count threshold while maintaining at least a minimum model resolution threshold. In some cases, computing device 310-a may determine the maximum vector count threshold based at least in part on a predetermined limit associated with the number of the plurality of vectors. In other examples, computing device 310-a may determine the minimum model resolution threshold based at least in part on a predetermined granularity for displaying the XR version of the three-dimensional model.

At block 415, computing device 310-a may assign components. For example, computing device 310-a may assign one or more components to the reduced number of the plurality of vectors of the three-dimensional model of the medical device. In other examples, computing device 310-a may configure the three-dimensional model to render externally visible components and internal components of the one or more components at a same time. In some cases, computing device 310-a may identify the one or more components based at on user input, where the user input comprises a manual selection of the one or more components by a user, a voice request to select the one or more components by the user, or both. The computing device 310-a may access a database configured to store the one or more components and retrieve the one or more components from the database.

At block 420, computing device 310-a may identify a parameter. For example, computing device 310-a may identify a parameter associated with the one or more components based on assigning the one or more components, where the parameter comprises a movement limitation, a size adjustment limitation, a color assignment, or a combination thereof. In some cases, computing device 310-a may assign the movement limitation to the one or more components based on user input, where the user input comprises an indication to update a location of the one or more components. In some cases, the movement limitation may comprise a rotational limitation of the one or more components, a translational limitation of the one or more components, or both.

In some examples, computing device 310-a may assign the size adjustment limitation to the one or more components based on user input, where the user input comprises an indication to update a size of the one or more components. In other examples, computing device 310-a may assign the color adjustment limitation to the one or more components based on user input, where the user input comprises an indication to update a color of the one or more components.

Figure 5:
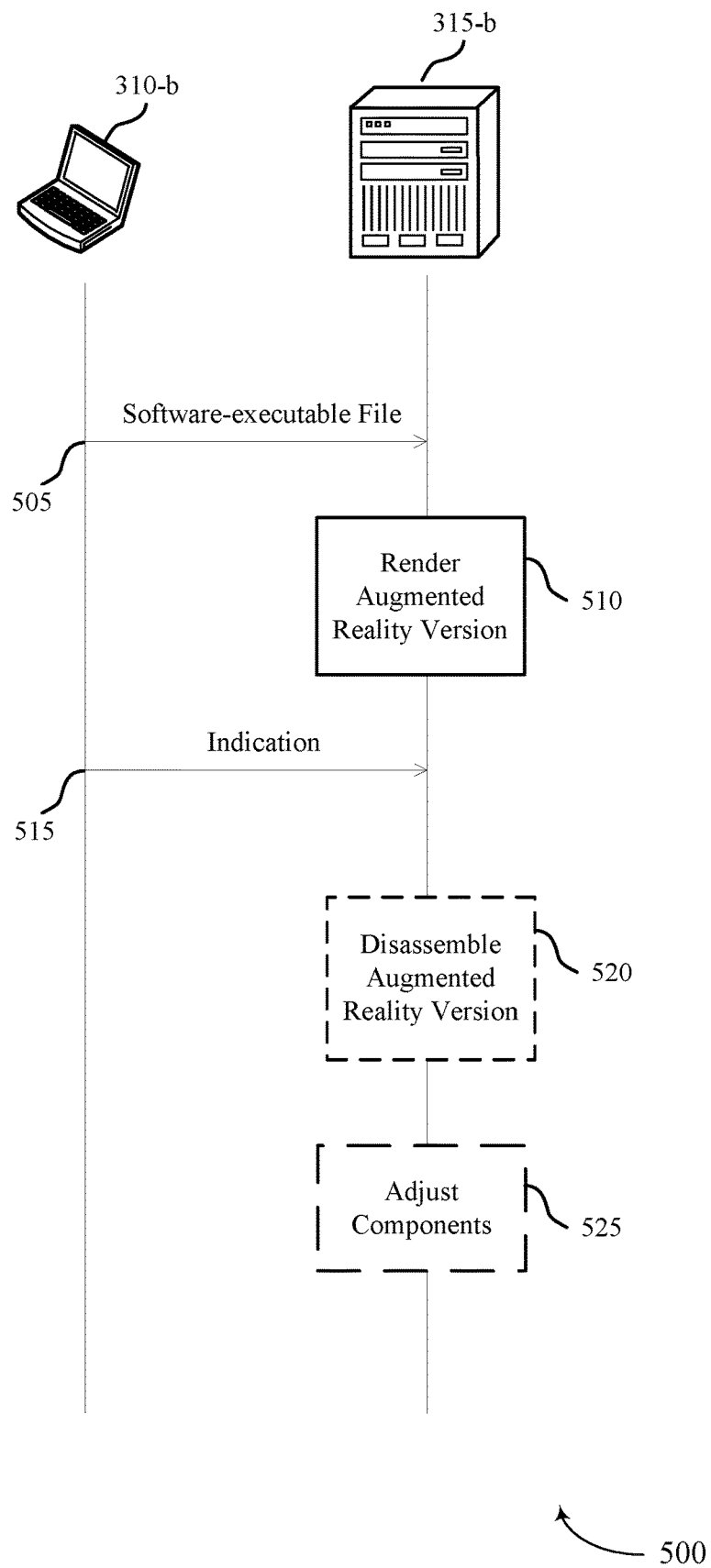
FIG. 5 illustrates an example of a process flow that supports XR assembly modeling in accordance with aspects of the present disclosure.

At block 425, computing device 310-a may configure a software-executable file for displaying an XR version of the three-dimensional model of the medical device. Computing device 310-a may transmit software-executable file 430. For example, computing device 310-a may transmit the software-executable file to an XR application configured to display the XR version of the three-dimensional model based at least in part on configuring the software-executable file FIG. 5 illustrates an example of a process flow 500 that supports XR assembly modeling in accordance with aspects of the present disclosure. Process flow 500 may include computing device 310-b and XR application server 315-b which may be respective examples of computing device 310 and XR application server 315 as described with reference to FIGS. 1-3. The computing device 310-b may be an example of a central station, server, or both as described herein. Alternative examples of the following may be implemented, where some steps are performed in a different order or not at all. Some steps may additionally include additional features not mentioned above.

Computing device 310-b may transmit a software-executable file 505. For example, XR application server 315-b may receive a software-executable file for displaying an XR version of a three-dimensional model of the medical device, where the three-dimensional model of the medical device is represented by a reduced number of a plurality of vectors. In some cases, the reduced number of the plurality of vectors may be at least below a maximum vector count threshold while maintaining at least a minimum model resolution threshold.

At block 510, XR application server 315-b may render an XR version. For example, XR application server 315-b may render the XR version of the three-dimensional model for display on the XR system. In some cases, XR application server 315-b may render externally visible components and internal components of the three-dimensional model at a same time, wherein the externally visible components and the internal components are assigned to the reduced number of the plurality of vectors of the three-dimensional model.

Computing device 310-b may transmit indication 515. For example, XR application server 315-b may receive an indication to manipulate the XR version of the three-dimensional model based at least in part on a user interaction with the XR version. In some cases, the indication to manipulate may comprise a voice command from a user, a manual selection of one or more components of the three-dimensional model from the user, a movement indicator from a wearable device associated with the user, or a combination thereof.

At block 520, XR application server 315-b may disassemble the XR version. For example, XR application server 315-b may disassemble the XR version of the three-dimensional model for identifying the internal components within the three-dimensional model in response to receiving the indication to manipulate.

At block 525, XR application server 315-b may adjust components. For example, XR application server 315-b may adjust a view of one or more components of the three-dimensional model based on receiving the indication to manipulate. In some examples, XR application server 315-b may adjust a location of one or more components of the three-dimensional model based on receiving the indication to manipulate, where adjusting the location comprises a rotation of the one or more components, a translation of the one or more components, or both. In other examples, XR application server 315-b may adjust a size of one or more components of the three-dimensional model based on receiving the indication to manipulate. In some cases, XR application server 315-b may adjust a color of one or more components of the three-dimensional model based on receiving the indication to manipulate.

Figure 6:
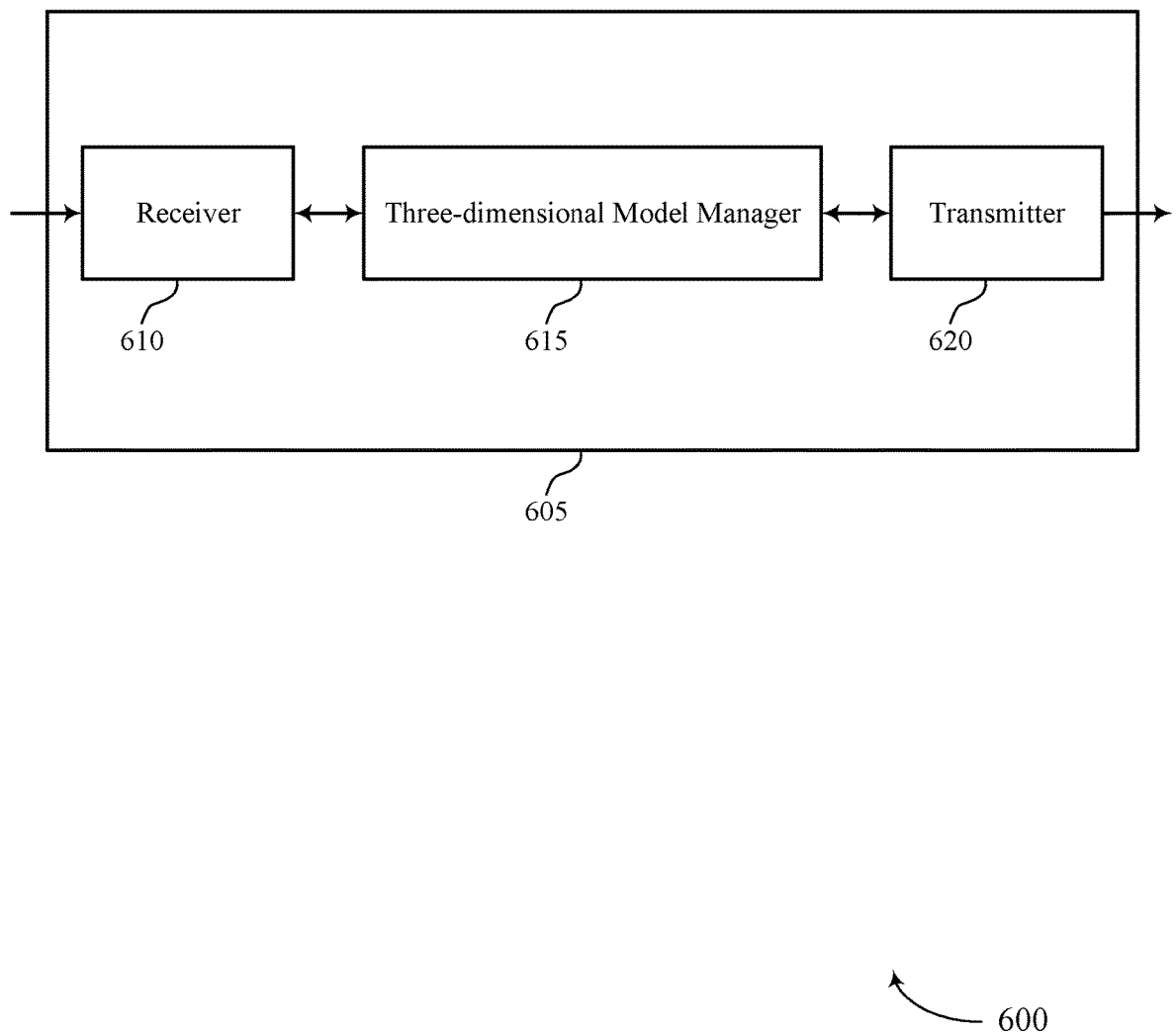
FIGS. 6 and 7 show block diagrams of devices that support XR assembly modeling in accordance with aspects of the present disclosure.

FIG. 6 shows a block diagram 600 of an XR application server 605 that supports XR assembly modeling in accordance with aspects of the present disclosure. The XR application server 605 may be an example of aspects of a device as described herein. The XR application server 605 may include a receiver 610, a three-dimensional model manager 615, and a transmitter 620. The XR application server 605 may also include a processor. Each of these components may be in communication with one another (e.g., via one or more buses).

The receiver 610 may receive information such as packets, user data, or control information associated with various information channels (e.g., control channels, data channels, and information related to XR assembly modeling, etc.). Information may be passed on to other components of the XR application server 605. The receiver 610 may be an example of aspects of the transceiver 920 described with reference to FIG. 9. The receiver 610 may utilize a single antenna or a set of antennas.

The three-dimensional model manager 615 may receive a three-dimensional model of the medical device, where the three-dimensional model is represented by a set of vectors, reduce a number of the set of vectors to at least below a maximum vector count threshold while maintaining at least a minimum model resolution threshold, assign one or more components to the reduced number of the set of vectors of the three-dimensional model of the medical device, and configure a software-executable file for displaying an XR version of the three-dimensional model of the medical device. The three-dimensional model manager 615 may also receive a software-executable file for displaying an XR version of a three-dimensional model of the medical device, where the three-dimensional model of the medical device is represented by a reduced number of a set of vectors, and where the reduced number of the set of vectors is at least below a maximum vector count threshold while maintaining at least a minimum model resolution threshold, render the XR version of the three-dimensional model for display on the XR system, and receive an indication to manipulate the XR version of the three-dimensional model based on a user interaction with the XR version. The three-dimensional model manager 615 may be an example of aspects of the three-dimensional model manager 910 described herein.

The three-dimensional model manager 615, or its sub-components, may be implemented in hardware, code (e.g., software or firmware) executed by a processor, or any combination thereof. If implemented in code executed by a processor, the functions of the three-dimensional model manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The three-dimensional model manager 615, or its sub-components, may be physically located at various positions, including being distributed such that portions of functions are implemented at different physical locations by one or more physical components. In some examples, the three-dimensional model manager 615, or its sub-components, may be a separate and distinct component in accordance with various aspects of the present disclosure. In some examples, the three-dimensional model manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the XR application server 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
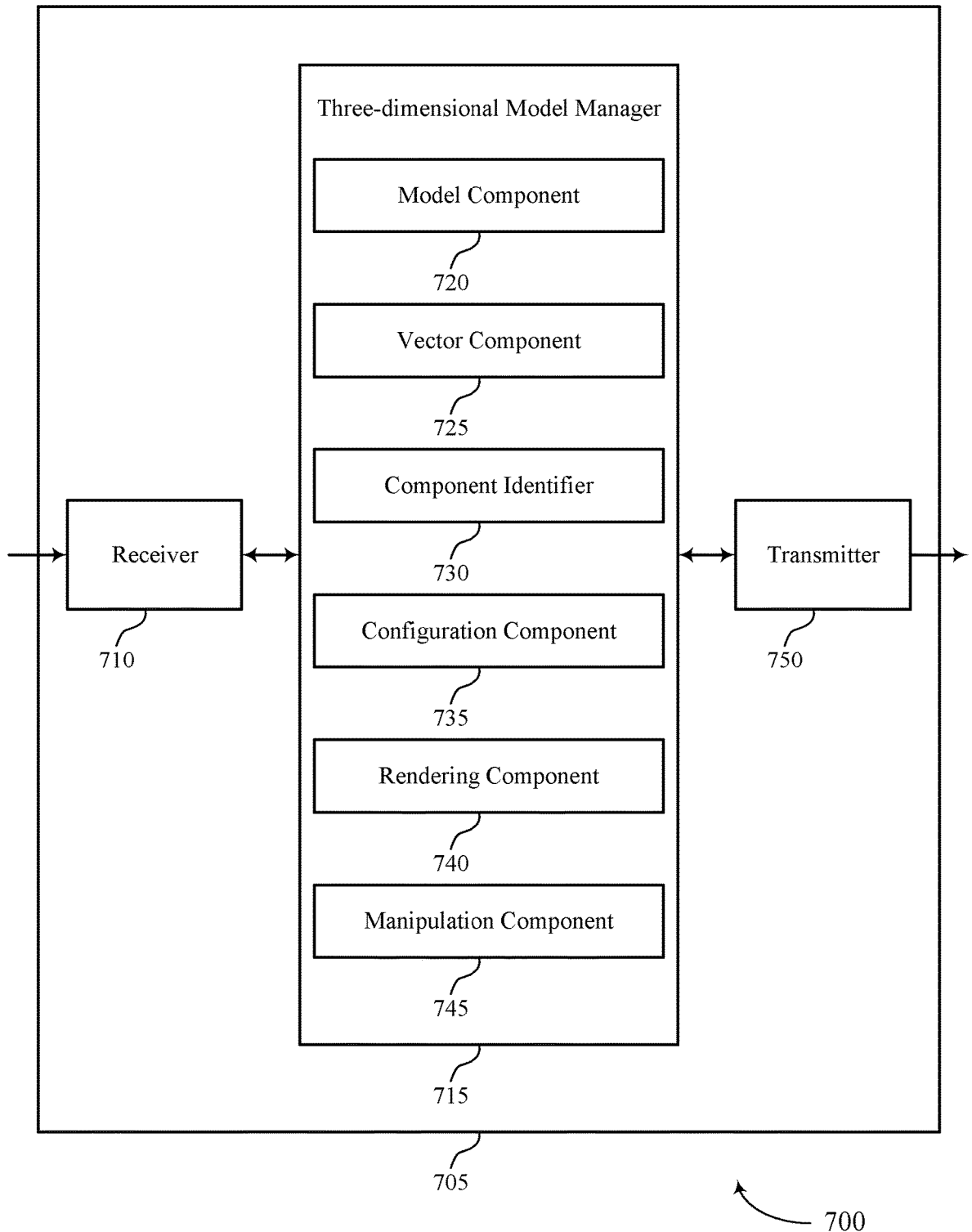

FIG. 7 shows a block diagram 700 of an XR application server 705 that supports XR assembly modeling in accordance with aspects of the present disclosure. The XR application server 705 may be an example of aspects of an XR application server 605 as described herein. The XR application server 705 may include a receiver 710, a three-dimensional model manager 715, and a transmitter 750. The XR application server 705 may also include a processor. Each of these components may be in communication with one another (e.g., via one or more buses).

The receiver 710 may receive information such as packets, user data, or control information associated with various information channels (e.g., control channels, data channels, and information related to XR assembly modeling, etc.). Information may be passed on to other components of the XR application server 705. The receiver 710 may be an example of aspects of the transceiver 920 described with reference to FIG. 9. The receiver 710 may utilize a single antenna or a set of antennas.

The three-dimensional model manager 715 may be an example of aspects of the three-dimensional model manager 615 as described herein. The three-dimensional model manager 715 may include a model component 720, a vector component 725, a component identifier 730, a configuration component 735, a rendering component 740, and a manipulation component 745. The three-dimensional model manager 715 may be an example of aspects of the three-dimensional model manager 910 described herein.

The model component 720 may receive a three-dimensional model of the medical device, where the three-dimensional model is represented by a set of vectors. The model component 720 may also receive a software-executable file for displaying an XR version of a three-dimensional model of the medical device, where the three-dimensional model of the medical device is represented by a reduced number of a set of vectors, and where the reduced number of the set of vectors is at least below a maximum vector count threshold while maintaining at least a minimum model resolution threshold.

The vector component 725 may reduce a number of the set of vectors to at least below a maximum vector count threshold while maintaining at least a minimum model resolution threshold.

The component identifier 730 may assign one or more components to the reduced number of the set of vectors of the three-dimensional model of the medical device.

The configuration component 735 may configure a software-executable file for displaying an XR version of the three-dimensional model of the medical device.

The rendering component 740 may render the XR version of the three-dimensional model for display on the XR system.

The manipulation component 745 may receive an indication to manipulate the XR version of the three-dimensional model based on a user interaction with the XR version.

The transmitter 750 may transmit signals generated by other components of the XR application server 705. In some examples, the transmitter 750 may be collocated with a receiver 710 in a transceiver module. For example, the transmitter 750 may be an example of aspects of the transceiver 920 described with reference to FIG. 9. The transmitter 750 may utilize a single antenna or a set of antennas.

Figure 8:
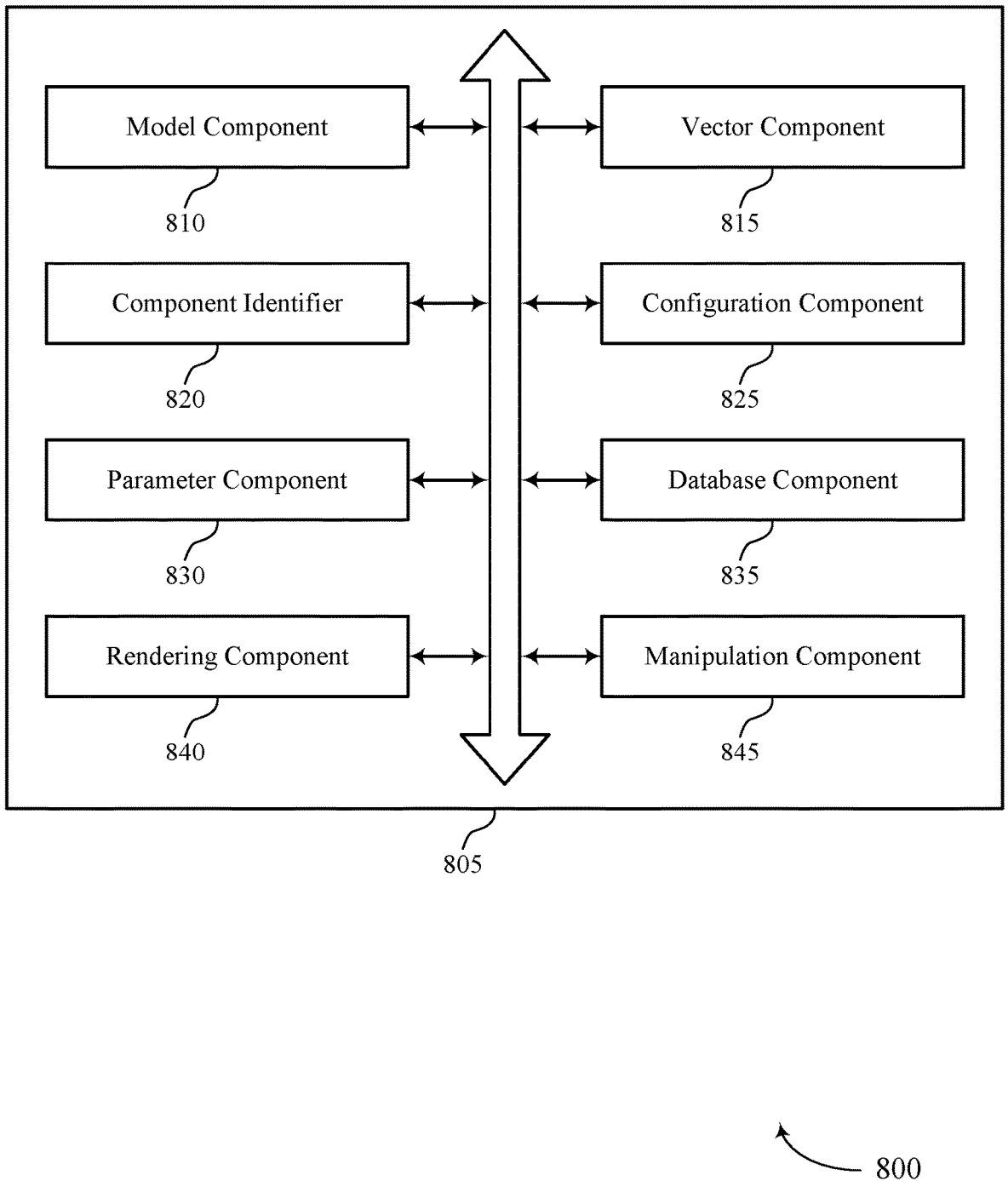
FIG. 8 shows a block diagram of a three-dimensional model manager that supports XR assembly modeling in accordance with aspects of the present disclosure.

FIG. 8 shows a block diagram 800 of a three-dimensional model manager 805 that supports XR assembly modeling in accordance with aspects of the present disclosure. The three-dimensional model manager 805 may be an example of aspects of a three-dimensional model manager 615, a three-dimensional model manager 715, or a three-dimensional model manager 910 described herein. The three-dimensional model manager 805 may include a model component 810, a vector component 815, a component identifier 820, a configuration component 825, a parameter component 830, a database component 835, a rendering component 840, and a manipulation component 845. Each of these modules may communicate, directly or indirectly, with one another (e.g., via one or more buses).

The model component 810 may receive a three-dimensional model of the medical device, where the three-dimensional model is represented by a set of vectors. In some examples, the model component 810 may receive a software-executable file for displaying an XR version of a three-dimensional model of the medical device, where the three-dimensional model of the medical device is represented by a reduced number of a set of vectors, and where the reduced number of the set of vectors is at least below a maximum vector count threshold while maintaining at least a minimum model resolution threshold.

The vector component 815 may reduce a number of the set of vectors to at least below a maximum vector count threshold while maintaining at least a minimum model resolution threshold. In some examples, the vector component 815 may determine the maximum vector count threshold based on a predetermined limit associated with the number of the set of vectors. In some examples, the vector component 815 may determine the minimum model resolution threshold based on a predetermined granularity for displaying the XR version of the three-dimensional model.

The component identifier 820 may assign one or more components to the reduced number of the set of vectors of the three-dimensional model of the medical device. In some examples, identifying the one or more components may be based on user input, where the user input includes a manual selection of the one or more components by a user, a voice request to select the one or more components by the user, or both.

The configuration component 825 may configure a software-executable file for displaying an XR version of the three-dimensional model of the medical device. In some examples, the configuration component 825 may configure the three-dimensional model to render externally visible components and internal components of the one or more components at a same time. In some examples, the configuration component 825 may transmit the software-executable file to an XR application configured to display the XR version of the three-dimensional model based on configuring the software-executable file.

The rendering component 840 may render the XR version of the three-dimensional model for display on the XR system. In some examples, the rendering component 840 may render externally visible components and internal components of the three-dimensional model at a same time, where the externally visible components and the internal components are assigned to the reduced number of the set of vectors of the three-dimensional model.

The manipulation component 845 may receive an indication to manipulate the XR version of the three-dimensional model based on a user interaction with the XR version. In some examples, the manipulation component 845 may disassemble the XR version of the three-dimensional model for identifying the internal components within the three-dimensional model in response to receiving the indication to manipulate.

In some examples, the manipulation component 845 may adjust a view of one or more components of the three-dimensional model based on receiving the indication to manipulate. In some examples, adjusting a location of one or more components of the three-dimensional model may be based on receiving the indication to manipulate, where adjusting the location includes a rotation of the one or more components, a translation of the one or more components, or both.

In some examples, the manipulation component 845 may adjust a size of one or more components of the three-dimensional model based on receiving the indication to manipulate. In some examples, the manipulation component 845 may adjust a color of one or more components of the three-dimensional model based on receiving the indication to manipulate. In some cases, the indication to manipulate includes a voice command from a user, a manual selection of one or more components of the three-dimensional model from the user, a movement indicator from a wearable device associated with the user, or a combination thereof.

The parameter component 830 may identify a parameter associated with the one or more components based on assigning the one or more components, where the parameter includes a movement limitation, a size adjustment limitation, a color assignment, or a combination thereof. In some examples, assigning the movement limitation to the one or more components may be based on user input, where the user input includes an indication to update a location of the one or more components.

In some examples, assigning the size adjustment limitation to the one or more components may be based on user input, where the user input includes an indication to update a size of the one or more components. In some examples, assigning the color adjustment limitation to the one or more components may be based on user input, where the user input includes an indication to update a color of the one or more components. In some cases, the movement limitation may include a rotational limitation of the one or more components, a translational limitation of the one or more components, or both.

The database component 835 may access a database configured to store the one or more components. In some examples, the database component 835 may retrieve the one or more components from the database.

Figure 9:
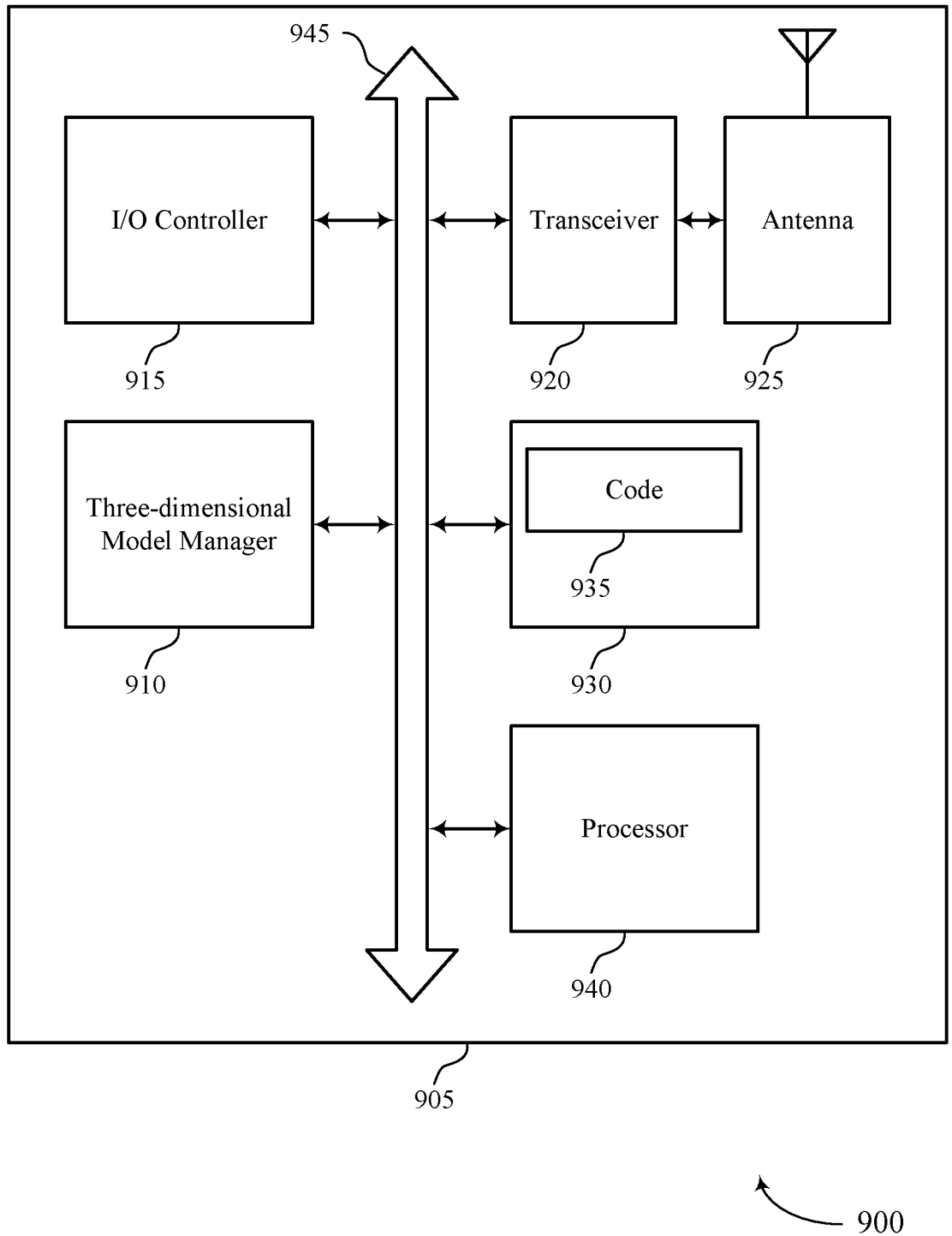
FIG. 9 shows a diagram of a system including a device that supports XR assembly modeling in accordance with aspects of the present disclosure.

FIG. 9 shows a diagram of a system 900 including an XR application server 905 that supports XR assembly modeling in accordance with aspects of the present disclosure. The XR application server 905 may be an example of or include the components of XR application server 605 or XR application server 705 as described herein. The XR application server 905 may include components for bi-directional voice and data communications including components for transmitting and receiving communications, including a three-dimensional model manager 910, an I/O controller 915, a transceiver 920, an antenna 925, memory 930, and a processor 940. These components may be in electronic communication via one or more buses (e.g., bus 945).

The three-dimensional model manager 910 may receive a three-dimensional model of the medical device, where the three-dimensional model is represented by a set of vectors, reduce a number of the set of vectors to at least below a maximum vector count threshold while maintaining at least a minimum model resolution threshold, assign one or more components to the reduced number of the set of vectors of the three-dimensional model of the medical device, and configure a software-executable file for displaying an XR version of the three-dimensional model of the medical device. The three-dimensional model manager 910 may also receive a software-executable file for displaying an XR version of a three-dimensional model of the medical device, where the three-dimensional model of the medical device is represented by a reduced number of a set of vectors, and where the reduced number of the set of vectors is at least below a maximum vector count threshold while maintaining at least a minimum model resolution threshold, render the XR version of the three-dimensional model for display on the XR system, and receive an indication to manipulate the XR version of the three-dimensional model based on a user interaction with the XR version.

The I/O controller 915 may manage input and output signals for the XR application server 905. The I/O controller 915 may also manage peripherals not integrated into the XR application server 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the XR application server 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the XR application server 905 to perform various functions (e.g., functions or tasks supporting XR assembly modeling).

The code 935 may include instructions to implement aspects of the present disclosure, including instructions to support creating a model of a medical device for use in an XR system. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
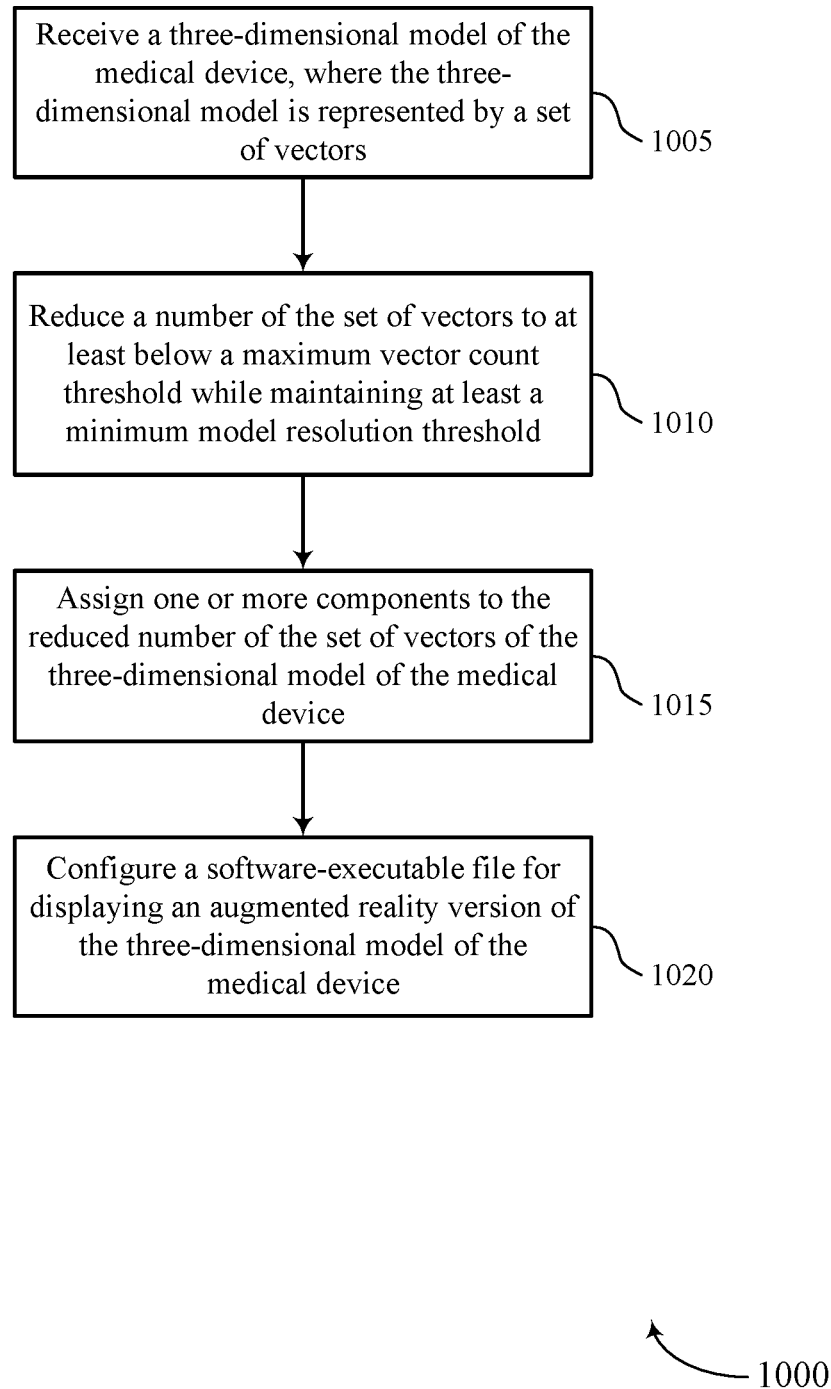
FIGS. 10-13 show flowcharts illustrating methods that support XR assembly modeling in accordance with aspects of the present disclosure.

FIG. 10 shows a flowchart illustrating a method 1000 that supports XR assembly modeling in accordance with aspects of the present disclosure. The operations of method 1000 may be implemented by a device or its components as described herein. For example, the operations of method 1000 may be performed by a three-dimensional model manager as described with reference to FIGS. 6 through 9. In some examples, a device may execute a set of instructions to control the functional elements of the device to perform the functions described below. Additionally or alternatively, a device may perform aspects of the functions described below using special-purpose hardware.

At 1005, the device may receive a three-dimensional model of the medical device, where the three-dimensional model is represented by a set of vectors. The operations of 1005 may be performed according to the methods described herein. In some examples, aspects of the operations of 1005 may be performed by a model component as described with reference to FIGS. 6 through 9.

At 1010, the device may reduce a number of the set of vectors to at least below a maximum vector count threshold while maintaining at least a minimum model resolution threshold. The operations of 1010 may be performed according to the methods described herein. In some examples, aspects of the operations of 1010 may be performed by a vector component as described with reference to FIGS. 6 through 9.

At 1015, the device may assign one or more components to the reduced number of the set of vectors of the three-dimensional model of the medical device. The operations of 1015 may be performed according to the methods described herein. In some examples, aspects of the operations of 1015 may be performed by a component identifier as described with reference to FIGS. 6 through 9.

At 1020, the device may configure a software-executable file for displaying an XR version of the three-dimensional model of the medical device. The operations of 1020 may be performed according to the methods described herein. In some examples, aspects of the operations of 1020 may be performed by a configuration component as described with reference to FIGS. 6 through 9.

Figure 11:
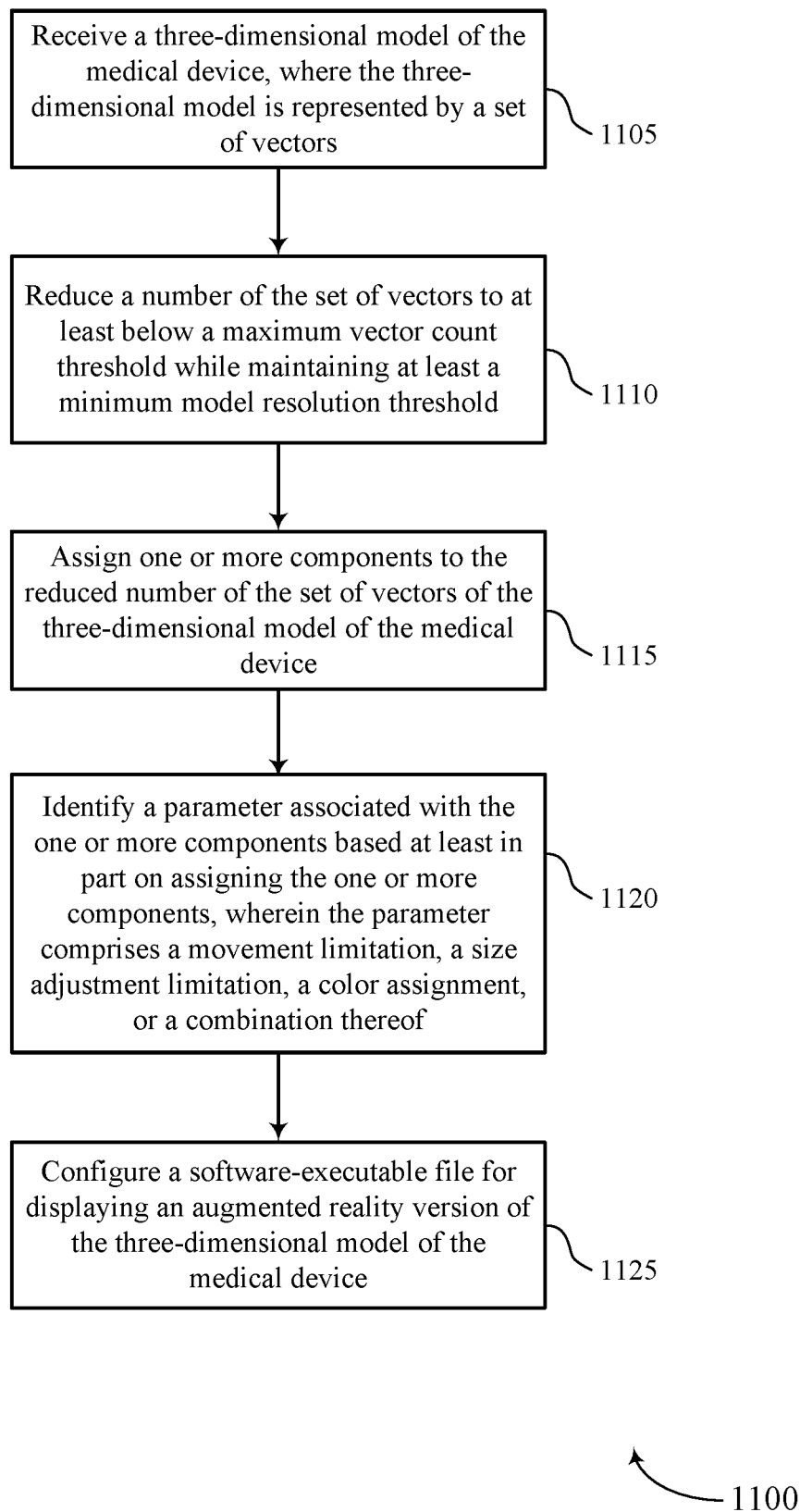

FIG. 11 shows a flowchart illustrating a method 1200 that supports XR assembly modeling in accordance with aspects of the present disclosure. The operations of method 1200 may be implemented by a device or its components as described herein. For example, the operations of method 1200 may be performed by a three-dimensional model manager as described with reference to FIGS. 6 through 9. In some examples, a device may execute a set of instructions to control the functional elements of the device to perform the functions described below. Additionally or alternatively, a device may perform aspects of the functions described below using special-purpose hardware.

At 1205, the device may receive a three-dimensional model of the medical device, where the three-dimensional model is represented by a set of vectors. The operations of 1205 may be performed according to the methods described herein. In some examples, aspects of the operations of 1205 may be performed by a model component as described with reference to FIGS. 6 through 9.

At 1210, the device may reduce a number of the set of vectors to at least below a maximum vector count threshold while maintaining at least a minimum model resolution threshold. The operations of 1210 may be performed according to the methods described herein. In some examples, aspects of the operations of 1210 may be performed by a vector component as described with reference to FIGS. 6 through 9.

At 1215, the device may assign one or more components to the reduced number of the set of vectors of the three-dimensional model of the medical device. The operations of 1215 may be performed according to the methods described herein. In some examples, aspects of the operations of 1215 may be performed by a component identifier as described with reference to FIGS. 6 through 9.

At 1220, the device may identify a parameter associated with the one or more components based at least in part on assigning the one or more components, wherein the parameter comprises a movement limitation, a size adjustment limitation, a color assignment, or a combination thereof. The operations of 1220 may be performed according to the methods described herein. In some examples, aspects of the operations of 1220 may be performed by a parameter component as described with reference to FIGS. 6 through 9.

At 1225, the device may configure a software-executable file for displaying an XR version of the three-dimensional model of the medical device. The operations of 1225 may be performed according to the methods described herein. In some examples, aspects of the operations of 1225 may be performed by a configuration component as described with reference to FIGS. 6 through 9.

Figure 12:
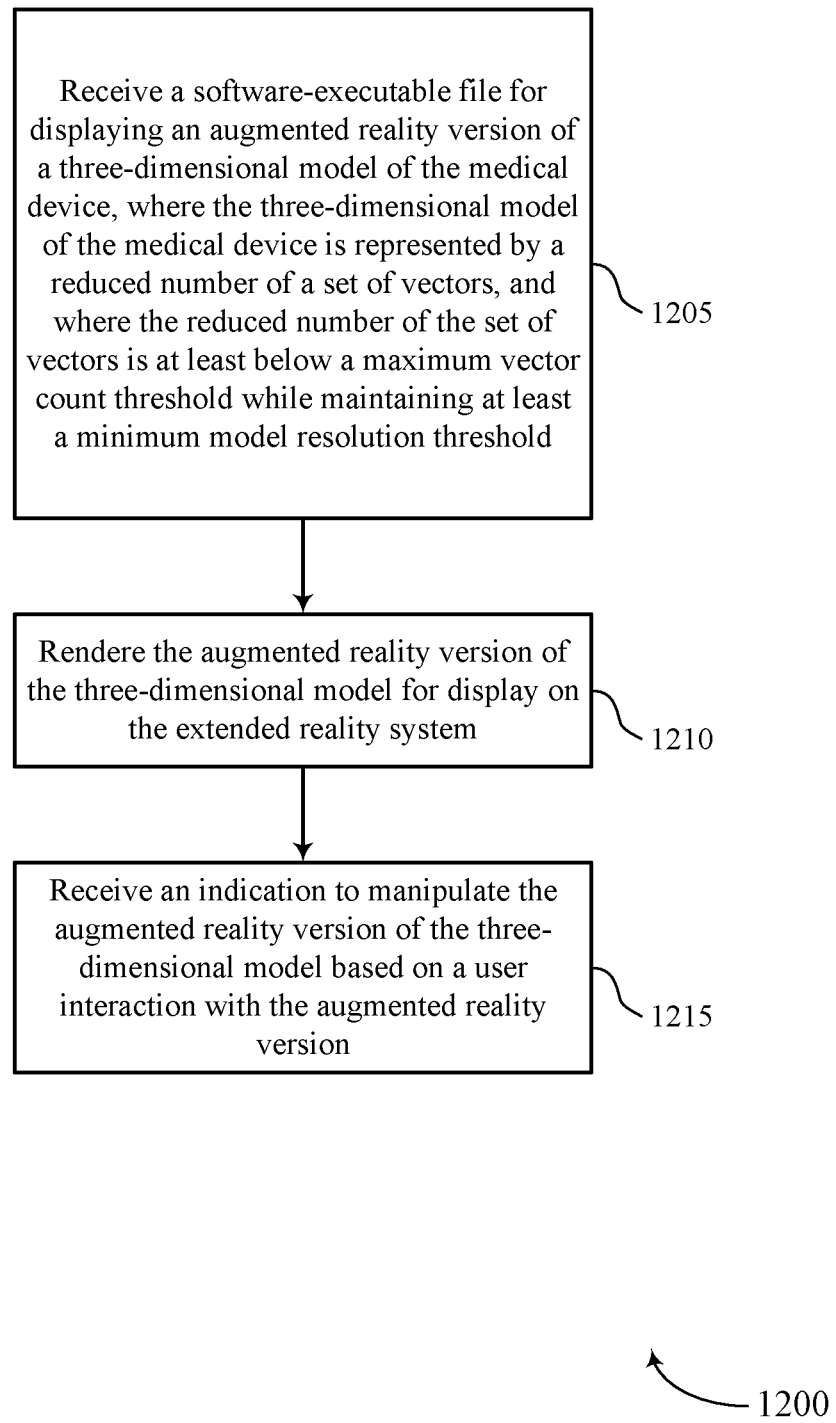

FIG. 12 shows a flowchart illustrating a method 1200 that supports XR assembly modeling in accordance with aspects of the present disclosure. The operations of method 1200 may be implemented by a device or its components as described herein. For example, the operations of method 1200 may be performed by a three-dimensional model manager as described with reference to FIGS. 6 through 9. In some examples, a device may execute a set of instructions to control the functional elements of the device to perform the functions described below. Additionally or alternatively, a device may perform aspects of the functions described below using special-purpose hardware.

At 1205, the device may receive a software-executable file for displaying an XR version of a three-dimensional model of the medical device, where the three-dimensional model of the medical device is represented by a reduced number of a set of vectors, and where the reduced number of the set of vectors is at least below a maximum vector count threshold while maintaining at least a minimum model resolution threshold. The operations of 1205 may be performed according to the methods described herein. In some examples, aspects of the operations of 1205 may be performed by a model component as described with reference to FIGS. 6 through 9.

At 1210, the device may render the XR version of the three-dimensional model for display on the XR system. The operations of 1210 may be performed according to the methods described herein. In some examples, aspects of the operations of 1210 may be performed by a rendering component as described with reference to FIGS. 6 through 9.

At 1215, the device may receive an indication to manipulate the XR version of the three-dimensional model based on a user interaction with the XR version. The operations of 1215 may be performed according to the methods described herein. In some examples, aspects of the operations of 1215 may be performed by a manipulation component as described with reference to FIGS. 6 through 9.

Figure 13:
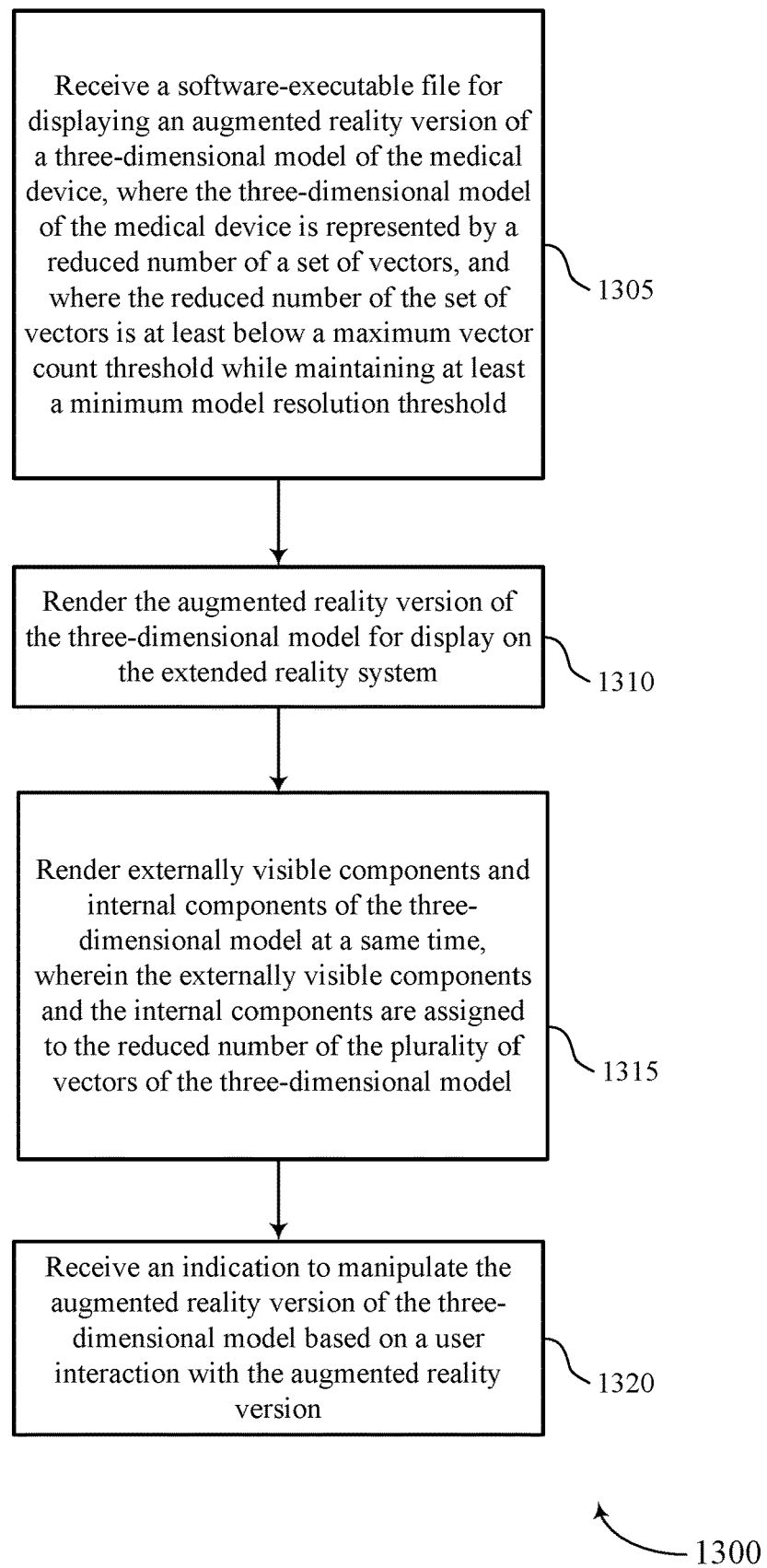

FIG. 13 shows a flowchart illustrating a method 1400 that supports XR assembly modeling in accordance with aspects of the present disclosure. The operations of method 1400 may be implemented by a device or its components as described herein. For example, the operations of method 1400 may be performed by a three-dimensional model manager as described with reference to FIGS. 6 through 9. In some examples, a device may execute a set of instructions to control the functional elements of the device to perform the functions described below. Additionally or alternatively, a device may perform aspects of the functions described below using special-purpose hardware.

At 1405, the device may receive a software-executable file for displaying an XR version of a three-dimensional model of the medical device, where the three-dimensional model of the medical device is represented by a reduced number of a set of vectors, and where the reduced number of the set of vectors is at least below a maximum vector count threshold while maintaining at least a minimum model resolution threshold. The operations of 1405 may be performed according to the methods described herein. In some examples, aspects of the operations of 1405 may be performed by a model component as described with reference to FIGS. 6 through 9.

At 1410, the device may render the XR version of the three-dimensional model for display on the XR system. The operations of 1410 may be performed according to the methods described herein. In some examples, aspects of the operations of 1410 may be performed by a rendering component as described with reference to FIGS. 6 through 9.

At 1415, the device may render externally visible components and internal components of the three-dimensional model at a same time, wherein the externally visible components and the internal components are assigned to the reduced number of the plurality of vectors of the three-dimensional model. The operations of 1415 may be performed according to the methods described herein. In some examples, aspects of the operations of 1415 may be performed by a rendering component as described with reference to FIGS. 6 through 9.

At 1420, the device may receive an indication to manipulate the XR version of the three-dimensional model based on a user interaction with the XR version. The operations of 1420 may be performed according to the methods described herein. In some examples, aspects of the operations of 1420 may be performed by a manipulation component as described with reference to FIGS. 6 through 9.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). A processor may in some cases be in electronic communication with a memory, where the memory stores instructions that are executable by the processor. Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of using a model of a medical device in an extended reality (XR) system, comprising:
   receiving a first three-dimensional model of the medical device, wherein the first three-dimensional model of the medical device is represented by a plurality of vectors, wherein a number of the plurality of vectors is higher than a maximum vector count threshold;
   reducing the number of the plurality of vectors to a reduced number of the plurality vectors, wherein the reduced number of the plurality of vectors is at least below the maximum vector count threshold while maintaining at least a minimum model resolution threshold, wherein a second three-dimensional model of the medical device is represented by the reduced number of the plurality of vectors;
   configuring a software-executable file to render an XR version of the second three-dimensional model for display on the XR system; and
   receiving an indication to manipulate the XR version of the second three-dimensional model based at least in part on a user interaction with the XR version.

2. The method of claim 1, further comprising:
   rendering externally visible components and internal components of the second three-dimensional model at a same time, wherein the externally visible components and the internal components are assigned to the reduced number of the plurality of vectors of the second three-dimensional model.

3. The method of claim 2, further comprising:
   disassembling the XR version of the second three-dimensional model for identifying the internal components within the second three-dimensional model in response to receiving the indication to manipulate.

4. The method of claim 1, further comprising:
   adjusting a view of one or more components of the second three-dimensional model based at least in part on receiving the indication to manipulate.

5. The method of claim 1, further comprising:
   adjusting a location of one or more components of the second three-dimensional model based at least in part on receiving the indication to manipulate, wherein adjusting the location comprises a rotation of the one or more components, a translation of the one or more components, or both.

6. The method of claim 1, further comprising:
   adjusting a size of one or more components of the second three-dimensional model based at least in part on receiving the indication to manipulate.

7. The method of claim 1, further comprising:
   adjusting a color of one or more components of the second three-dimensional model based at least in part on receiving the indication to manipulate.

8. An apparatus for using a model of a medical device in an extended reality (XR) system, comprising:
   a processor;
   memory in electronic communication with the processor; and
   instructions stored in the memory and executable by the processor to cause the apparatus to:
      receive a first three-dimensional model of the medical device, wherein the first three-dimensional model of the medical device is represented by a plurality of vectors, wherein a number of the plurality of vectors is higher than a maximum vector count threshold;
      reduce the number of the plurality of vectors to a reduced number of the plurality vectors, wherein the reduced number of the plurality of vectors is at least below the maximum vector count threshold while maintaining at least a minimum model resolution threshold, wherein a second three-dimensional model of the medical device is represented by the reduced number of the plurality of vectors;
      configure a software-executable file to render an XR version of the second three-dimensional model for display on the XR system; and
      receive an indication to manipulate the XR version of the second three-dimensional model based at least in part on a user interaction with the XR version.

9. The apparatus of claim 8, wherein the instructions are further executable by the processor to cause the apparatus to:
   render externally visible components and internal components of the second three-dimensional model at a same time, wherein the externally visible components and the internal components are assigned to the reduced number of the plurality of vectors of the second three-dimensional model.

10. The apparatus of claim 9, wherein the instructions are further executable by the processor to cause the apparatus to:
    disassemble the XR version of the second three-dimensional model for identifying the internal components within the second three-dimensional model in response to receiving the indication to manipulate.

11. The apparatus of claim 8, wherein the instructions are further executable by the processor to cause the apparatus to:
    adjust a view of one or more components of the second three-dimensional model based at least in part on receiving the indication to manipulate.

12. The apparatus of claim 8, wherein the instructions are further executable by the processor to cause the apparatus to:
    adjust a location of one or more components of the second three-dimensional model based at least in part on receiving the indication to manipulate, wherein adjusting the location comprises a rotation of the one or more components, a translation of the one or more components, or both.

13. The apparatus of claim 8, wherein the instructions are further executable by the processor to cause the apparatus to:
    adjust a size of one or more components of the second three-dimensional model based at least in part on receiving the indication to manipulate.

14. The apparatus of claim 8, wherein the instructions are further executable by the processor to cause the apparatus to:
    adjust a color of one or more components of the second three-dimensional model based at least in part on receiving the indication to manipulate.

15. A non-transitory computer-readable medium storing code for using a model of a medical device in an extended reality (XR) system, the code comprising instruction executable by a processor to:
    receive a first three-dimensional model of the medical device, wherein the first three-dimensional model of the medical device is represented by a plurality of vectors, wherein a number of the plurality of vectors is higher than a maximum vector count threshold;
    reduce the number of the plurality of vectors to a reduced number of the plurality vectors, wherein the reduced number of the plurality of vectors is at least below the maximum vector count threshold while maintaining at least a minimum model resolution threshold, wherein a second three-dimensional model of the medical device is represented by the reduced number of the plurality of vectors;

configure a software-executable file to render an XR version of the second three-dimensional model for display on the XR system; and receive an indication to manipulate the XR version of the second three-dimensional model based at least in part on a user interaction with the XR version.

16. The non-transitory computer-readable medium of claim 15, wherein the instructions are further executable to:
render externally visible components and internal components of the second three-dimensional model at a same time, wherein the externally visible components and the internal components are assigned to the reduced number of the plurality of vectors of the second three-dimensional model.

17. The non-transitory computer-readable medium of claim 16, wherein the instructions are further executable to:
disassemble the XR version of the second three-dimensional model for identifying the internal components within the second three-dimensional model in response to receiving the indication to manipulate.

18. The non-transitory computer-readable medium of claim 15, wherein the instructions are further executable to:
adjust a view of one or more components of the second three-dimensional model based at least in part on receiving the indication to manipulate.

19. The non-transitory computer-readable medium of claim 15, wherein the instructions are further executable to:
adjust a location of one or more components of the second three-dimensional model based at least in part on receiving the indication to manipulate, wherein adjusting the location comprises a rotation of the one or more components, a translation of the one or more components, or both.

20. The non-transitory computer-readable medium of claim 15, wherein the instructions are further executable to:
adjust a size of one or more components of the second three-dimensional model based at least in part on receiving the indication to manipulate.

21. The non-transitory computer-readable medium of claim 15, wherein the instructions are further executable to:
adjust a color of one or more components of the second three-dimensional model based at least in part on receiving the indication to manipulate.

* * * * *